United States Patent
Wu et al.

(10) Patent No.: US 8,849,117 B2
(45) Date of Patent: Sep. 30, 2014

(54) SESSION-BASED DYNAMIC BANDWIDTH ALLOCATION APPLIED TO PASSIVE OPTICAL NETWORK

(71) Applicant: National Chung Cheng University, Chia-Yi (TW)

(72) Inventors: Cheng-Shong Wu, Minxiong Township, Chiayi County (TW); Hui-Kai Su, Chia-Yi (TW); Steven Lee, Bade (TW); Ting-Chao Hou, Dong-Rong Village (TW)

(73) Assignee: National Chung Cheng University, Min-Hsiung, Chia-Yi (TW)

( * ) Notice: Subject to any disclaimer, the term of this patent is extended or adjusted under 35 U.S.C. 154(b) by 155 days.

(21) Appl. No.: 13/727,353

(22) Filed: Dec. 26, 2012

(65) Prior Publication Data
US 2014/0119730 A1   May 1, 2014

(51) Int. Cl.
*H04B 10/20* (2006.01)
*H04L 12/28* (2006.01)
*H04L 12/70* (2013.01)

(52) U.S. Cl.
CPC ............ *H04L 47/00* (2013.01); *H04L 12/2861* (2013.01)
USPC .................................. 398/58; 398/63; 398/72

(58) Field of Classification Search
USPC .......................................... 398/58, 63, 70, 72
See application file for complete search history.

(56) References Cited

U.S. PATENT DOCUMENTS

| | | | |
|---|---|---|---|
| 2004/0141759 A1* | 7/2004 | Stiscia et al. .................. | 398/168 |
| 2008/0273878 A1 | 11/2008 | Wu et al. | |
| 2009/0103545 A1* | 4/2009 | Anschutz et al. .......... | 370/395.4 |
| 2010/0208747 A1* | 8/2010 | Gordon et al. ................ | 370/468 |
| 2010/0239252 A1* | 9/2010 | Davis et al. ...................... | 398/58 |
| 2012/0128349 A1* | 5/2012 | Mitsunaga et al. ............. | 398/25 |
| 2013/0121697 A1* | 5/2013 | Luo et al. ........................ | 398/58 |

FOREIGN PATENT DOCUMENTS

TW   200824346   6/2008

* cited by examiner

*Primary Examiner* — Dzung Tran
(74) *Attorney, Agent, or Firm* — Muncy, Geissler, Olds & Lowe, P.C.

(57) ABSTRACT

A session-based dynamic bandwidth allocation applied to PON includes the steps of A) duplicating, under PON system, packets transmitted to a splitter from every ONU and filtering the packets as per session classification via a snooping agent of the ONU to get specific packets; B) making every ONU transmit the specific packets to a bandwidth analyzer via a tunneling; C) analyzing information of the specific packets or the relativities between every specific packet and the previous and next packets via the bandwidth analyzer to further generate a session state information and save it into a database; and D) making an OLT access the session state information in the database and applying an SDBA to the dynamic bandwidth allocation.

7 Claims, 3 Drawing Sheets

SESSION-BASED DYNAMIC BANDWIDTH ALLOCATION APPLIED TO PASSIVE OPTICAL NETWORK

BACKGROUND OF THE INVENTION

1. Field of the Invention

The present invention relates generally to the network technology and more particularly, to a session-based dynamic bandwidth allocation applied to passive optical network.

2. Description of the Related Art

As the Internet-based applications become diverse, many application programs are based on session and developed into peer-to-peer and point-to-multipoint from the traditional client/server architecture. Most of multimedia streaming application services adopt session mode, which is characterized in that the data channel is dynamically determined in the course of communication establishment and the mediate formats are exchanged dynamically, such as session descript protocol (SDP). Thus, the network packet not only fails to determine the application species from the pure IP address and TCP/UDP port but fails to accurately assess the required bandwidths for the application services beforehand.

In addition, taking passive optical network (PON) as an example, uplink bandwidth is the resource shared by all optical network units (ONU), so state reporting dynamic bandwidth allocation (SR DBA) or traffic dynamic bandwidth allocation (TM DMA) is generally adopted for dynamic bandwidth allocation. However, neither SR DBA nor TM DBA could apply immediate and accurate dynamic allocation to the required bandwidth of every ONU.

U.S. Pat. Pub. No. 2008/0273878 A1 disclosed a method for mapping a service flow to a service transmission channel, which includes the steps of configuring configuration parameters for a message characteristic into an optical network terminal (ONT); and mapping a service flow to a specified service transmission channel when it is determined that the service flow matches the configured message characteristic after the service flow is received by the ONT.

Taiwan Pat. Laid-open No. 2008/24346 disclosed a method of Ethernet passive optical network dynamic bandwidth allocation in consideration of service quality. This method is to inspect the control codes regarding connection establishment and disconnection of application services in the information contents of the application services via a detector and the output of the detector is connected with a bandwidth state report unit of a customer premise equipment of the optical network; the bandwidth state report unit gives the required bandwidth a queue length; the bandwidth allocation unit located at optical line terminal (OLT) inspects queue length report column content of received report message to know the user's bandwidth requirement and then allocates adequate bandwidth to ONU for use. However, such conventional bandwidth allocation method still fails to apply immediate and accurate dynamic allocation to the required bandwidth of every ONU.

SUMMARY OF THE INVENTION

The primary objective of the present invention is to provide a session-based dynamic bandwidth allocation applied to passive optical network, which can apply immediate and accurate dynamic allocation to bandwidth.

The foregoing objective of the present invention is attained by the session-based dynamic bandwidth allocation having the steps of A) duplicating, under PON system, packets transmitted to a splitter from every ONU and filtering the packets as per session classification via a snooping agent of the ONU to get specific packets; B) making every ONU transmit the specific packets to a bandwidth analyzer via a tunneling; C) analyzing information of the specific packets or the relativities between every specific packet and the previous and next packets via the bandwidth analyzer to further generate a session state information and save it into a database; and D) making the OLT access the session state information in the database and applying a session-based dynamic bandwidth allocation (SDBA) to the dynamic bandwidth allocation. Taking gigabyte passive optical network (GPON) as an example, the SDBA works like that the ONU reports back the sending buffer state via dynamic bandwidth reporting upstream (DBAu) report of GPON transmission convergence (GTC) frame for dynamic request bandwidth and after determining the bandwidth allocation, the OLT designates an initial point and a session of uplink transmission for every ONU via bandwidth map (BWumap) of the GTC frame to further control the use of uplink bandwidth resource of every ONU.

Preferably, in the step A), each of the duplicate packets contains an Internet group management protocol (IGMP) packet, a real time streaming protocol (RTSP) packet, or a session initiation protocol (SIP) packet. The snooping agent filters the duplicate packets to get the specific packets via the session classification subject to the format of IGMP packet, RTSP packet, or SIP packet.

Preferably, in the step C), while what is to be analyzed via the bandwidth analyzer is the RTSP packet, analyze the relativities between every packet and the previous and next ones and meanwhile, analyze the session description protocol (SDP) of every RTSP packet to acquire the information of multimedia format and to infer required data bandwidth of every session in such a way that the session state information is formed.

Preferably, in the step C), while what is to be analyzed via the bandwidth analyzer is the IGMP packet, associate media access control (MAC) address of source end, Internet protocol (IP) address of the source end, and class D group address and apply dynamic maintenance to an IGMP membership table to further form the session state information.

Preferably, in the step C), while what is to be analyzed via the bandwidth analyzer is the SIP packet, fetch required media information from the DSP of the SIP packet and meanwhile, compare the required media information with a media bandwidth reference table to infer required uplink and downlink bandwidths for every session to further generate the session state information.

Preferably, in the step D), while the SDBA is applied to the dynamic bandwidth allocation, extra reserved data throughput is $(t4-t2+RTT(ONUn))\times(BWu(ONUn))$ where $t2$ denotes the time that OLT receives the sending buffer state reported back by ONUn (Nth ONU), $t4$ denotes the time that OLT sends ONUn bandwidth allocation information, $RTT(ONUn)$ denotes the round-trip time from OLT to ONUn, and $BWu(ONUn)$ denotes the required uplink bandwidth analyzed by the bandwidth analyzer for the session application of the ONUn.

DETAILED DESCRIPTION OF PREFERRED EMBODIMENTS

The present invention will become more fully understood by reference to a preferred embodiment given hereunder. However, it is to be understood that the preferred embodiment is given by way of illustration only, thus are not limitative of the claim scope of the present invention.

Figure 1:
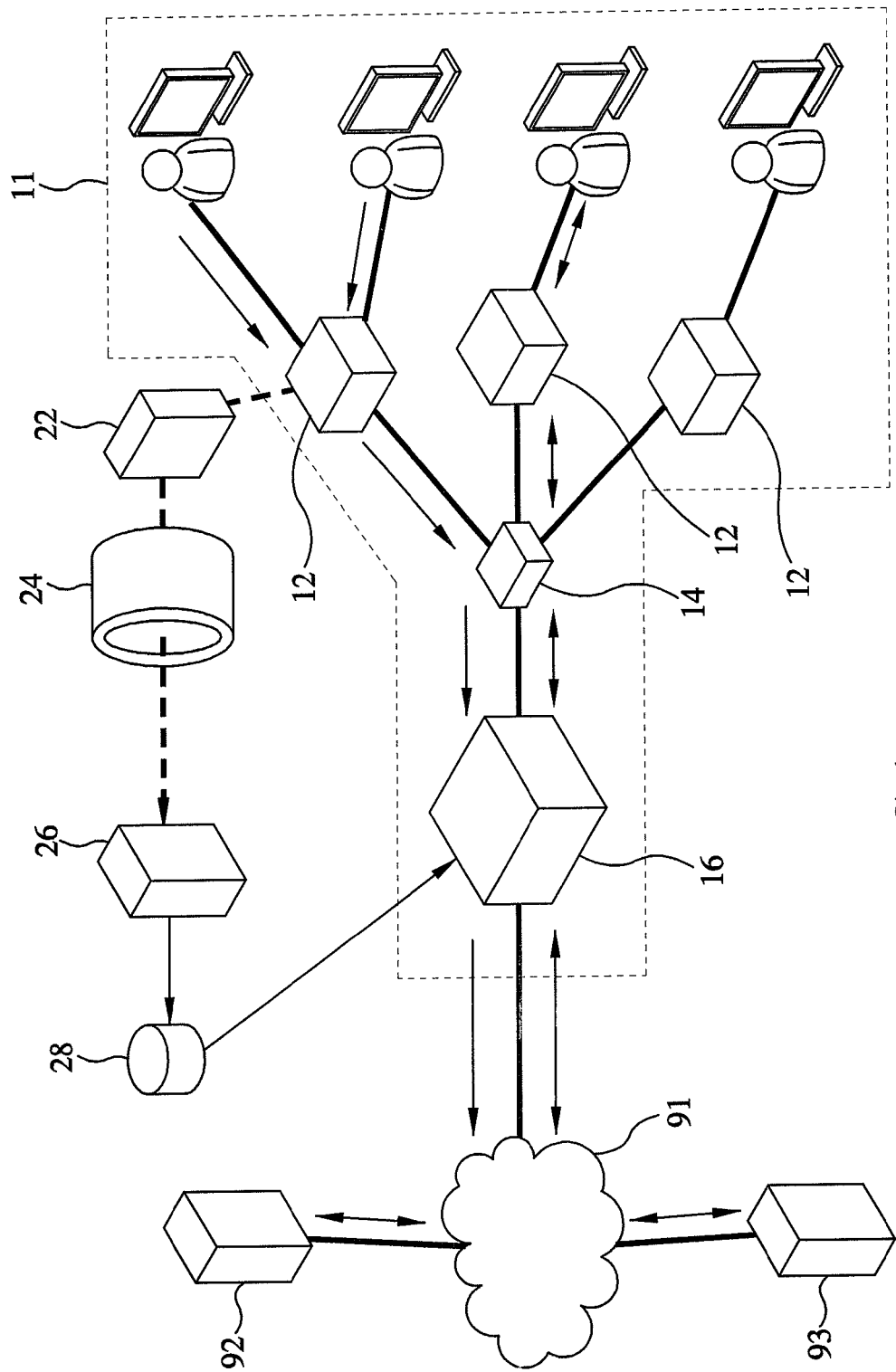
FIG. 1 is a block diagram of a preferred embodiment of the present invention.
Figure 2:
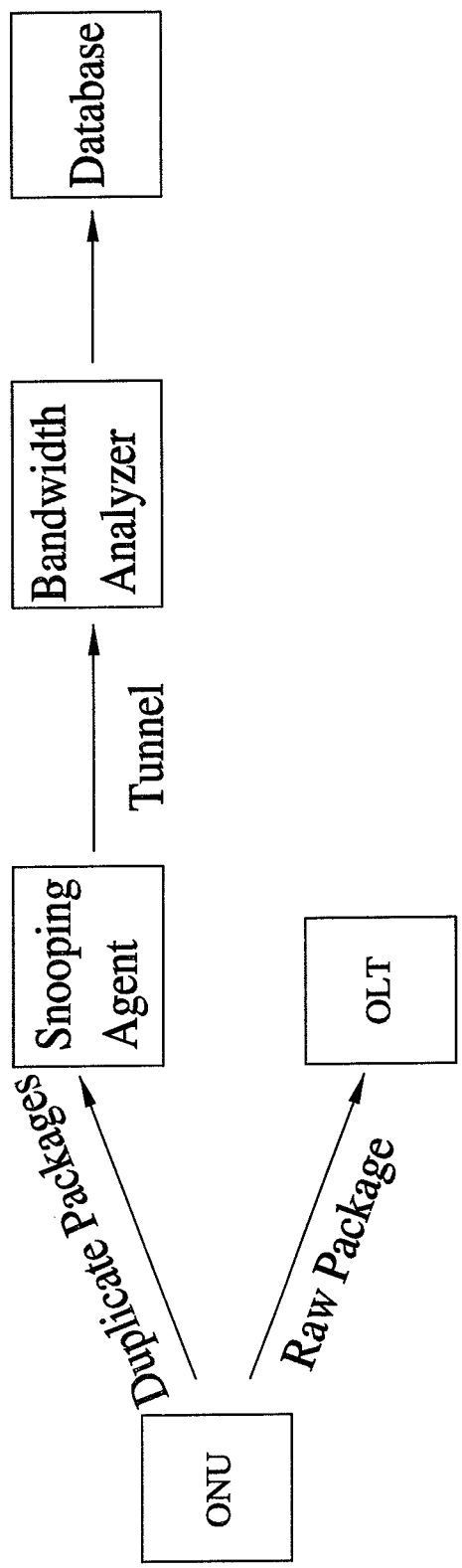
FIG. 2 is a flow chart of data in accordance with the preferred embodiment of the present invention.
Figure 3:
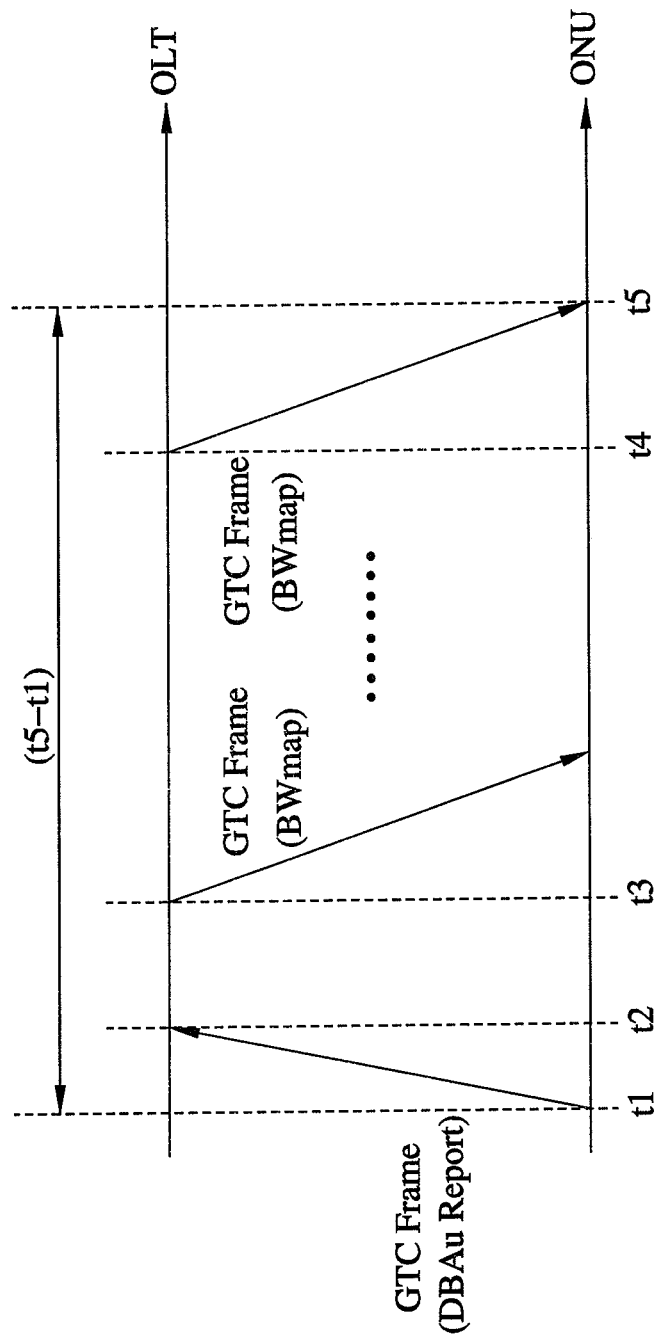
FIG. 3 is a time chart of bandwidth request and calculation between GTC frame and ONU in accordance with the preferred embodiment of the present invention.

Referring to FIGS. 1-3, a session-based dynamic bandwidth allocation applied to passive optical network in accordance with a preferred embodiment of the present invention includes the following steps.

A) Under a PON system 11, duplicate packets transmitted to a splitter 14 from every ONU 12 and filter the duplicate packets as per session classification via a snooping agent 22 of the ONU 12 to get specific packets. The PON system 11 is formed of a plurality of ONUs 12 connected with an OLT 16 via the splitter 14. Each of the duplicate packets includes an IGMP packet, an RTSP packet, or an SIP packet. When the snooping agent 22 filters the duplicate packets as per the session classification to get the specific packets, the session classification proceeds based on the format of the IGMP packet, the RTSP packet, or the SIP packet.

B) Make every ONU 12 transmit the specific packets to a bandwidth analyzer 26 via a tunneling. In this embodiment, the tunnel adopted by the tunneling is indicated by the reference 20. sign 24 shown in FIG. 1 for transmission in the existing PON circuits or exclusive circuits.

C) Analyze the information of the specific packets or the relativities between every specific packet and the previous and next packets via the bandwidth analyzer 26 to further generate a session state information and save it into a database. When what is to be analyzed via the bandwidth analyzer is the RTSP packet, analyze the relativities between every packet and the previous and next ones and meanwhile, analyze the SDP of every RTSP packet to acquire the information of multimedia format and to infer required data bandwidth of every session in such a way that the session state information is formed. When what is to be analyzed via the bandwidth analyzer is the IGMP packet, associate media access control (MAC) address of source end, Internet protocol (IP) address of the source end, and class D group address and apply dynamic maintenance to an IGMP membership table to further form the session state information. When what is to be analyzed via the bandwidth analyzer is the SIP packet, fetch required media information from the DSP of the SIP packet and meanwhile, compare the required media information with a media bandwidth reference table to infer required uplink and downlink bandwidths for every session to further generate the session state information. The IGMP membership table and the media bandwidth reference table can be understood by the person of ordinary skill in the art, so they are not shown via any drawing or table.

D) Make the OLT access the session state information in the database 28 and apply an SDBA to the dynamic bandwidth allocation. Taking GPON as an example, the SDBA works like that the ONU 12 reports back sending buffer state via DBAu report of GTC frame for dynamic request bandwidth and after determining the bandwidth allocation, the OLT 16 designates an initial point and a session of uplink transmission via BWmap of the GTC frame for every ONU 12 to further control the use of uplink bandwidth resource of every ONU. In FIG. 1, the OLT 16 is connected to other server 92 or computer 93 via Internet 91, which is nothing but the application of the external connection to be relevant to the subject matters of the present invention and thus no more recitation is necessary.

In the step D), as shown in FIG. 3, as far as the algorithm of the conventional GPON SR DBA as basis is concerned, it is necessary to additionally estimate the data transmission throughput of session application of $(t5-t1) \times BWu(ONUn)$ where t1 denotes the time that ONUn reports back the sending buffer state, t5 denotes the time that ONU 12 receives the OLT's 16 designated bandwidth allocation information, and $BWu(ONUn)$ denotes the required uplink bandwidth of session application of the ONUn as analyzed by the bandwidth analyzer 26. However, the session application bandwidth needs extra reserved data throughput.

Likewise, as shown in FIG. 3, when the SDBA is adopted instead of the algorithm of the aforesaid conventional SR DBA for dynamic bandwidth allocation, the extra reserved data throughput is $(t4-t2+RTT(ONUn)) \times (BWu(ONUn))$ where t2 denotes the time that the OLT 16 receives the sending buffer state reported back by ONUn, t4 denotes the time that the OLT 16 sends ONUn bandwidth allocation information, $RTT(ONUn)$ denotes the round-trip time from the OLT 16 to ONUn, and $BWu(ONUn)$ denotes the required uplink bandwidth of session application of the ONUn as analyzed by the bandwidth analyzer 26.

Note that the aforesaid embodiment is though based on the GPON as an example but not limited to the GPON and the present invention can also be applied to the general PON for bandwidth allocation.

In conclusion, the aforesaid steps take advantage of session bandwidth analyzation and integration of SDBA to give extra bandwidth resource required for session internet application immediate streaming beforehand, to guarantee the uplink bandwidth resource required for the immediate session application, and to proceed with accurate dynamic bandwidth allocation, so the connection quality is more stable.

What is claimed is:

1. A session-based dynamic bandwidth allocation applied to passive optical network, comprising steps of:
   A) duplicating, under a passive optical network (PON) system, packets transmitted to a splitter from every optical network unit (ONU) and filtering the packets as per session classification via a snooping agent of the ONU to get specific packets where the PON system is formed of a plurality of ONUs connected with an optical line termination (OLT) via the splitter;
   B) making every ONU transmit the specific packets to a bandwidth analyzer via a tunneling;
   C) analyzing information of the specific packets or the relativities between every specific packet and the previous and next packets via the bandwidth analyzer to further generate a session state information and save it into a database; and
   D) making the OLT access the session state information in the database and applying a session-based dynamic bandwidth allocation (SDBA) to the dynamic bandwidth allocation where taking gigabyte passive optical network (GPON) as an example, the SDBA works like that the ONU reports back the sending buffer state via dynamic bandwidth reporting upstream (DBAu) report of GPON transmission convergence (GTC) frame for dynamic request bandwidth and after determining the bandwidth allocation, the OLT designates an initial point and a session of uplink transmission for every ONU via bandwidth map (BWumap) of the GTC frame to further control the use of uplink bandwidth resource of every ONU.

2. The session-based dynamic bandwidth allocation as defined in claim 1, wherein in the step A), each of the duplicate packets contains an Internet group management protocol (IGMP) packet, a real time streaming protocol (RTSP) packet, or a session initiation protocol (SIP) packet; the snooping agent filters the duplicate packets to get the specific packets via the session classification subject to the format of IGMP packet, RTSP packet, or SIP packet.

3. The session-based dynamic bandwidth allocation as defined in claim 2, wherein the step C) further comprises sub-steps of analyzing the relativities between every packet and the previous and next ones, while what is to be analyzed via the bandwidth analyzer is the RTSP packet, and analyzing the session description protocol (SDP) of every RTSP packet to acquire the information of multimedia format and to infer required data bandwidth of every session in such a way that the session state information is formed.

4. The session-based dynamic bandwidth allocation as defined in claim 2, wherein the step C) further comprises sub-steps of associating media access control (MAC) address of source end, Internet protocol (IP) address of the source end, and class D group address, while what is to be analyzed via the bandwidth analyzer is the IGMP packet, and applying dynamic maintenance to an IGMP membership table to further form the session state information.

5. The session-based dynamic bandwidth allocation as defined in claim 2, wherein the step C) further comprises sub-steps of fetching required media information from the DSP of the SIP packet, while what is to be analyzed via the bandwidth analyzer is the SIP packet, and comparing the required media information with a media bandwidth reference table to infer required uplink and downlink bandwidths for every session to further generate the session state information.

6. The session-based dynamic bandwidth allocation as defined in claim 1, wherein in the step D), while the SDBA is applied to the dynamic bandwidth allocation, extra reserved data throughput is $(t4-t2+RTT(ONUn)) \times (BWu(ONUn))$ where $t2$ denotes the time that OLT receives the sending buffer state reported back by ONUn (Nth ONU), $t4$ denotes the time that OLT sends ONUn bandwidth allocation information, $RTT(ONUn)$ denotes the round-trip time from OLT to ONUn, and $BWu(ONUn)$ denotes the required uplink bandwidth analyzed by the bandwidth analyzer for the session application of the ONUn.

7. The session-based dynamic bandwidth allocation as defined in claim 1, wherein in the step B), the tunnel adopted by the tunneling is for transmission in the existing PON circuits or exclusive circuits.

* * * * *